US008427361B2

(12) United States Patent  
Sato

(10) Patent No.: US 8,427,361 B2  
(45) Date of Patent: Apr. 23, 2013

(54) RADAR APPARATUS FOR USE IN VEHICLE

(75) Inventor: Koichi Sato, Kariya (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 13/199,628

(22) Filed: Sep. 6, 2011

(65) Prior Publication Data

US 2012/0056773 A1  Mar. 8, 2012

(30) Foreign Application Priority Data

Sep. 7, 2010  (JP) ................................. 2010-199988

(51) Int. Cl.  
*G01S 13/93* (2006.01)

(52) U.S. Cl.  
USPC ................. 342/70; 342/71; 342/72; 342/107; 342/111; 342/114; 342/128; 342/192

(58) Field of Classification Search ............. 342/70–72, 342/107–111, 113–116, 128, 192, 196; 340/903, 340/435–436; 701/301  
See application file for complete search history.

(56) References Cited

U.S. PATENT DOCUMENTS

| 5,268,692 | A | * | 12/1993 | Grosch et al. | 342/70 |
|---|---|---|---|---|---|
| 5,929,802 | A | * | 7/1999 | Russell et al. | 342/70 |
| 6,107,956 | A | * | 8/2000 | Russell et al. | 342/70 |
| 6,597,308 | B2 | * | 7/2003 | Isaji | 342/70 |
| 6,888,494 | B2 | * | 5/2005 | Tamatsu et al. | 342/128 |
| 6,924,762 | B2 | * | 8/2005 | Miyake et al. | 342/70 |
| 7,248,209 | B2 | * | 7/2007 | Shima et al. | 342/173 |
| 7,567,204 | B2 | * | 7/2009 | Sakamoto | 342/91 |
| 7,932,854 | B2 | * | 4/2011 | Ando | 342/70 |
| 2003/0052813 | A1 | * | 3/2003 | Natsume | 342/70 |
| 2003/0218564 | A1 | * | 11/2003 | Tamatsu et al. | 342/70 |
| 2006/0132350 | A1 | * | 6/2006 | Boltovets et al. | 342/70 |
| 2006/0262007 | A1 | * | 11/2006 | Bonthron et al. | 342/70 |

FOREIGN PATENT DOCUMENTS

| JP | 07225270 A | * | 8/1995 |
|---|---|---|---|
| JP | 2001-324566 | | 11/2001 |
| JP | 2004-340755 | | 12/2004 |
| JP | 2006-010410 | | 1/2006 |
| JP | 2006208201 A | * | 8/2006 |
| JP | 2007-093481 | | 4/2007 |
| JP | 2008-014956 | | 1/2008 |
| JP | 2008-051771 | | 3/2008 |
| JP | 2009-133761 | | 6/2009 |
| JP | 2012058018 A | * | 3/2012 |

* cited by examiner

*Primary Examiner* — John B Sotomayor  
(74) *Attorney, Agent, or Firm* — Harness, Dickey & Pierce, PLC

(57) ABSTRACT

The radar apparatus includes a target candidate detecting means for detecting a peak frequency at which the intensity of the power spectrum of a beat signal peaks as a target candidate, a road shape recognizing means to sequentially connect, along a predetermined direction, the target candidates detected to be stationary and present within a reference distance from one of the target candidates set as a reference target candidate for one or more measurement cycles and recognize an area formed by the sequentially connected target candidates as an edge of the road, a cruise environment estimating means to determine whether the cruise environment is a closed space or an open space based on the power spectrum, and a reference distance correcting means to shorten the reference distance when the cruise environment is determined to be a closed space.

10 Claims, 11 Drawing Sheets

RADAR APPARATUS FOR USE IN VEHICLE

This application claims priority to Japanese Patent Application No. 2010-199988 filed on Sep. 7, 2010, the entire contents of which are hereby incorporated by reference.

BACKGROUND OF THE INVENTION

1. Field of the Invention

The present invention relates to a radar apparatus having a structure in which a beat signal generated by mixing transmission and reception signals of a radar wave is processed to detect a target reflecting the radar wave.

2. Description of Related Art

There is known a vehicle-mounted radar apparatus configured to transmit a radar wave having been frequency-modulated in a triangular wave shape along a time axis at a predetermined measurement cycle, receive the radar wave reflected from a target, frequency-analyze a beat signal generated by mixing the transmission and reception signals of the radar wave to provide a power spectrum, and detect a peak frequency at which the intensity (power) of the power spectrum peaks as a target candidate. If the target candidate continues to be detected for one or more measurement cycles, the target candidate is recognized as a target such as a preceding vehicle or a roadside object when a predetermined condition is met.

When a vehicle equipped with such a radar apparatus is running in a closed space such as a tunnel, the radar apparatus receives, in addition to the radar wave reflected by a target, the radar wave reflected by the target and further by the tunnel wall or tunnel ceiling, or equipment in the tunnel such as a jet fan.

In this case, the radar apparatus may detect the peak frequency of the reflected radar wave as a target candidate although it does not exist, that is, although it is a so-called ghost.

To deal with this problem, it is proposed to change a detection threshold when the vehicle runs in a tunnel. For example, refer to Japanese Patent Application Laid-open No. 2008-51771. The radar apparatus disclosed in this patent document is configured to determine that the vehicle is running in a tunnel if the illuminance level outside of the vehicle measured by an illuminance sensor mounted on the vehicle is below a predetermined threshold value.

However, since the illuminance level measured by the illuminance sensor is always below the threshold value when the vehicle runs in a dark environment, for example, when the vehicle runs at night, the radar apparatus may erroneously determine that the vehicle is running in a tunnel although the vehicle is running in an open space. In this case, since the detection threshold is changed wrongly, the accuracy of target recognition is degraded.

That is, the conventional radar apparatus as described in the above patent document cannot accurately determine whether or not the vehicle is running in a closed space, and accordingly cannot accurately recognize a target in a dark environment.

SUMMARY

An embodiment provides a radar apparatus for use in a vehicle comprising:

a transmitting/receiving means configured to transmit a radar wave in accordance with a transmission signal frequency-modulated so as to linearly vary in frequency with time at every measurement cycle, receive the radar wave reflected from a target as a reflected wave, output a reception signal in accordance with the received reflected wave, and generate a beat signal by mixing the transmission signal with the reception signal;

a frequency analyzing means configured to calculate power spectrum indicative of intensity of each frequency component of the beat signal each time the transmitting/receiving means generates the beat signal;

a target candidate detecting means for detecting a peak frequency at which the intensity of the power spectrum peaks as a target candidate and calculating a position and a speed of the target candidate each time the frequency analyzing means calculates the power spectrum;

a road shape recognizing means configured to sequentially connect, along a predetermined direction, the target candidates detected to be stationary and present within a first reference distance from one of the target candidates set as a reference target candidate by the target candidate detecting means for one or more measurement cycles in order to prepare a group of the target candidates sequentially connected, and recognize an area formed by the sequentially connected target candidates as an edge of a road on which the vehicle runs;

an object recognizing means configured to determine, for each of the target candidates detected to be moving by the target candidate detecting means, that the target candidate is a moving object if a position of the target candidate detected in the present measurement cycle continues to be within a predetermined second reference distance from a predicted position estimated from a position of the target candidate detected in the previous measurement cycle for a predetermined number of the measurement cycles;

a cruise environment estimating means configured to estimate that cruise environment representing road environment of the vehicle is a closed space where space above the vehicle is closed if an integral value of intensity of the power spectrum calculated by the frequency analyzing means for a predetermined frequency range is larger than a predetermined threshold value, and otherwise is an open space where space above the vehicle is open; and a reference distance correcting means configured to shorten at least one of the first and second reference distances when the cruise environment is estimated to be a closed space by the cruise environment estimating means compared to when the cruise environment is estimated to be an open space by the cruise environment estimating means.

According to the present invention, there is provided a radar apparatus for use in a vehicle capable of accurately determining whether the cruise environment is an open space or a closed space by itself, to prevent the accuracy of recognition of objects from being deteriorated.

Other advantages and features of the invention will become apparent from the following description including the drawings and claims.

PREFERRED EMBODIMENTS OF THE INVENTION

Figure 1:
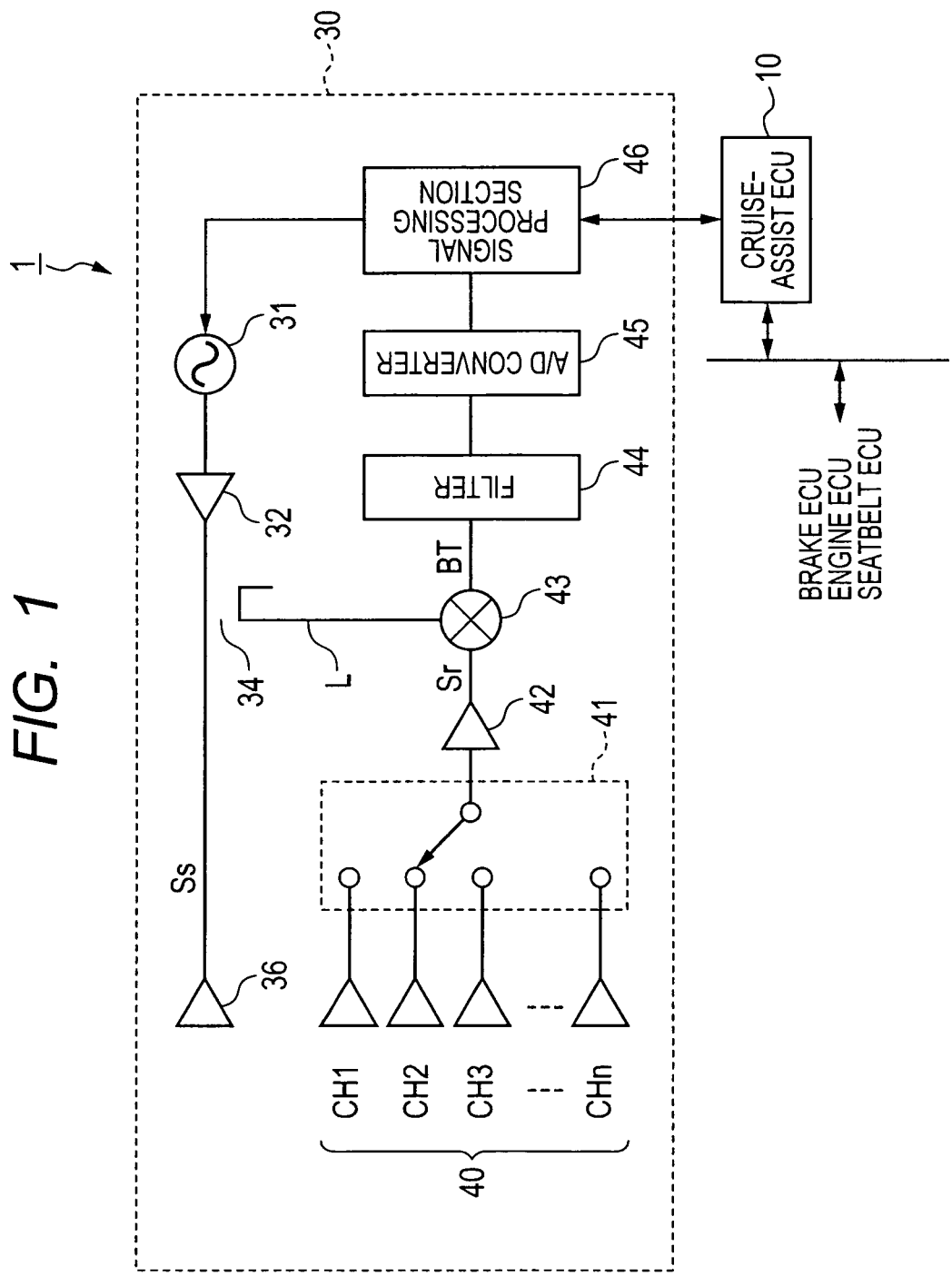
FIG. 1 is a block diagram showing the schematic structure of a cruise-assist control system including a radar apparatus according to an embodiment of the invention.

FIG. 1 is a block diagram showing the schematic structure of a cruise-assist control system 1 including a radar apparatus used as a radar sensor 30 according to an embodiment of the invention.

The cruise-assist control system 1 is constituted of the radar sensor 30 that detects a target present in the vicinity of the own vehicle (the vehicle on which the cruise-assist control system 1 is mounted) by transmitting and receiving a radar wave and generates information regarding a detected target (referred to as the target information hereinafter, and a cruise-assist electronic control unit (referred to as the cruise-assist ECU hereinafter) 10. In this embodiment, the target information includes at least the position of a detected target and a relative speed of the target (the speed of the target with respect to the own vehicle).

The cruise-assist ECU 10 is mainly constituted of a microcomputer including a ROM, a RAM, a CPU and a bus controller to enable communication with the outside through a LAN communication bus.

The cruise-assist ECU 10 is connected with an alarm buzzer, a cruise control switch and a target following-distance setting switch, which are not shown. The cruise-assist ECU 10 is further connected with a brake ECU, an engine ECU and a seatbelt ECU through the LAN communication bus. In this embodiment, as a protocol for data communication among these ECUs through the LAN communication bus, the CAN (Controller Area Network) proposed by Robert Bosch Corp. is adopted.

The cruise-assist ECU 10 is configured to perform cruise assist control based on the target information received from the radar sensor 30. The cruise assist control includes adaptive cruise control to keep the following distance with a preceding vehicle at a predetermined distance, and pre-crash safety control to output an alarm and tighten the seatbelts when the following distance with the preceding vehicle becomes shorter than the predetermined distance.

Next, the structure of the radar sensor 30 is described.

The radar sensor 30, which is a millimeter-wave radar apparatus of the FMCW type, includes an oscillator 31, an amplifier 32, a divider 34, a transmitting antenna 35 and a receiving antenna device 40. The oscillator 31 generates a high frequency signal of the millimeter-wave band which is frequency-modulated to have an ascending section during which the frequency linearly ascends with time and a descending section during which the frequency linearly descends with time. The amplifier 32 amplifies the high frequency signal generated by the oscillator 31. The divider 34 divides the output of the amplifier 31 into a transmission signal Ss and a local signal L. The transmitting antenna 36 transmits a radar wave in accordance with the transmission signal Ss. The receiving antenna device 40 includes n (n being an integer larger than 1) receiving antennas to receive a reflected version of the radar wave. The receiving antennas of the receiving antenna device 40 are assigned with channels CH1 to CHn, respectively.

The radar sensor 30 further includes a reception switch 41, an amplifier 42, a mixer 43, a filter 44, an A/D converter 45 and a signal processing section 46. The reception switch 41 sequentially selects one of the receiving antennas of the receiving antenna device 40, and transfers a reception signal Sr outputted from the selected receiving antenna to the amplifier 42. The amplifier 42 amplifies the reception signal received from the reception switch 42. The mixer 43 mixes the reception signal Sr amplified by the amplifier 42 with the local signal L to generate a beat signal BT representing the frequency difference between the transmission signal Ss and the reception signal Sr. The filter 44 removes unnecessary components from the beat signal BT. The A/D 45 converter samples the output of the filter 44 to convert the beat signal BT into digital sample data. The signal processing section 46 detects a target reflecting the radar wave using the sample data, and performs a main process to generate target information regarding the detected target.

The signal processing section 46 is mainly constitute of a microcomputer including a ROM, a RAM, a CPU and an arithmetic processing unit (DSP, for example) to perform FFT (Fast Fourier Transform) on the data received from the A/D converter 45.

The radar sensor 30 is configured such that, when the oscillator 31 oscillates to generate the high frequency signal in accordance with a command received from the signal processing section 46, the divider 34 divides the high frequency signal generated by the oscillator 31 and amplified by the amplifier 32 into the transmission signal Ss and the local signal L, the transmission signal being transmitted as the radar wave through the transmitting antenna 36.

The radar wave transmitted from the transmitting antenna 36 and reflected by a target (that is, the reflected wave) is received by the receiving antennas of the receiving antenna device 40, and the reception signal Sr of the reception channel CHi (i=1, . . . 2) selected by the reception switch 41 is amplified by the amplifier 32 and supplied to the mixer 43. The mixer 43 mixes the reception signal Sr with the local signal L supplied from the divider 3 to generate the beat signal BT. This beat signal BT from which unnecessary components have been removed by the filter 44 is converted into digital sample data by the A/D converter 45, and inputted to the signal processing section 46.

The reception switch 41 is operated such that each of the channels CH1 to CHn is selected the same number of times (512 times, for example) during one modulation cycle of the radar wave. The A/D converter 45 performs sampling in synchronization with the selection timing of the channels CH1 to CHn. Accordingly, the sample data is accumulated for each of the channel CH1 to CHn for each of the ascending and descending periods of the radar wave.

Figure 2:
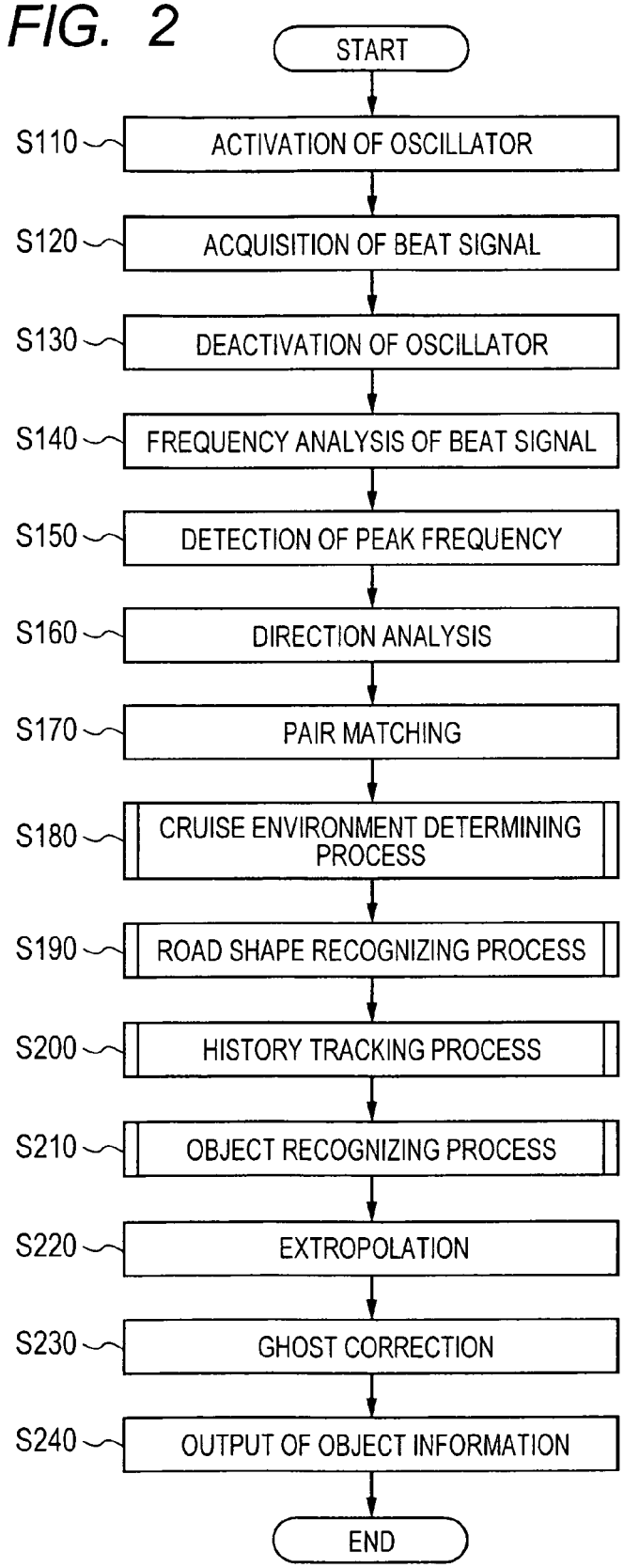
FIG. 2 is a flowchart showing a main process performed by the radar apparatus.

Next, the main process performed by the radar sensor 30 is explained with reference to the flowchart of FIG. 2.

The main process is started at every measurement cycle. This process begins by activating the oscillator 31 to start transmission of the radar wave in step S110. In subsequent step S120, sampled values of the beat signal BT as many as necessary are acquired through the A/D converter 45. In subsequent step S130, the oscillator 31 is deactivated to stop transmission of the radar wave.

Thereafter, the sampled values acquired in step S130 are subjected to a frequency analysis (FFT process in this embodiment) to detect power spectrum for each of the channels CH1 to CHn for each of the ascending and descending periods in step S140. The power spectrum represents intensity of each of frequency components of the beat signal BT.

Subsequently, a peak frequency is detected for each of the ascending and descending periods in step S150. More specifically, an arithmetic average of the power spectrums of all the reception channels is calculated as an average spectrum, and a frequency at which the average spectrum peaks above a predetermined threshold values is detected as a peak frequency.

Thereafter, a direction analysis is performed based on the power spectrums acquired in step S140 to estimate the direction in which a target candidate is present in step S160. In this embodiment, the direction analysis is performed using the MUSIC method in which a MUSIC (Multiple Signal Classification) spectrum is determined from power spectrums using an antenna null point having a narrow half-angle value. According to the MUSIC method, the peak point of the MUSIC spectrum represents the direction in which a target candidate is present.

Subsequently, there is performed a pair matching in which two peak frequencies of the beat signal BT for the ascending period and the descending period, which can be assumed to be originated from the same target are registered in pair in step S170. More specifically, if each of the differences in power and phase angle between the peak frequency for the ascending period and the peak frequency for the descending period is within an allowable range, they are registered in pair. Each of the registered pairs of the peak frequencies corresponds to a target candidate.

In the pair matching in step S170, the distance from the radar sensor 30 to the target candidate, relative speed of the target candidate with respect to the own vehicle are calculated for each of the registered pairs of the peak frequencies. In this embodiment, the speed of the target candidate and whether the target candidate is a stationary object or a moving object are determined based on the relative speed between the target candidate and the own vehicle and the speed of the own vehicle. The calculated distance and the relative speed plus the direction of the target candidate are prepared as target information.

Thereafter, a cruise environment determining process (step S180), a road shape recognizing process (step S190), a history tracking process (step S200) and an object recognizing process (S210) are performed successively (to be explained in detail later). Subsequently, extrapolation (step S220) and ghost correction (step S230) are carried out, and finally the target information regarding a selected object is outputted to the cruise-assist ECU 10 (step S240).

Figure 3:
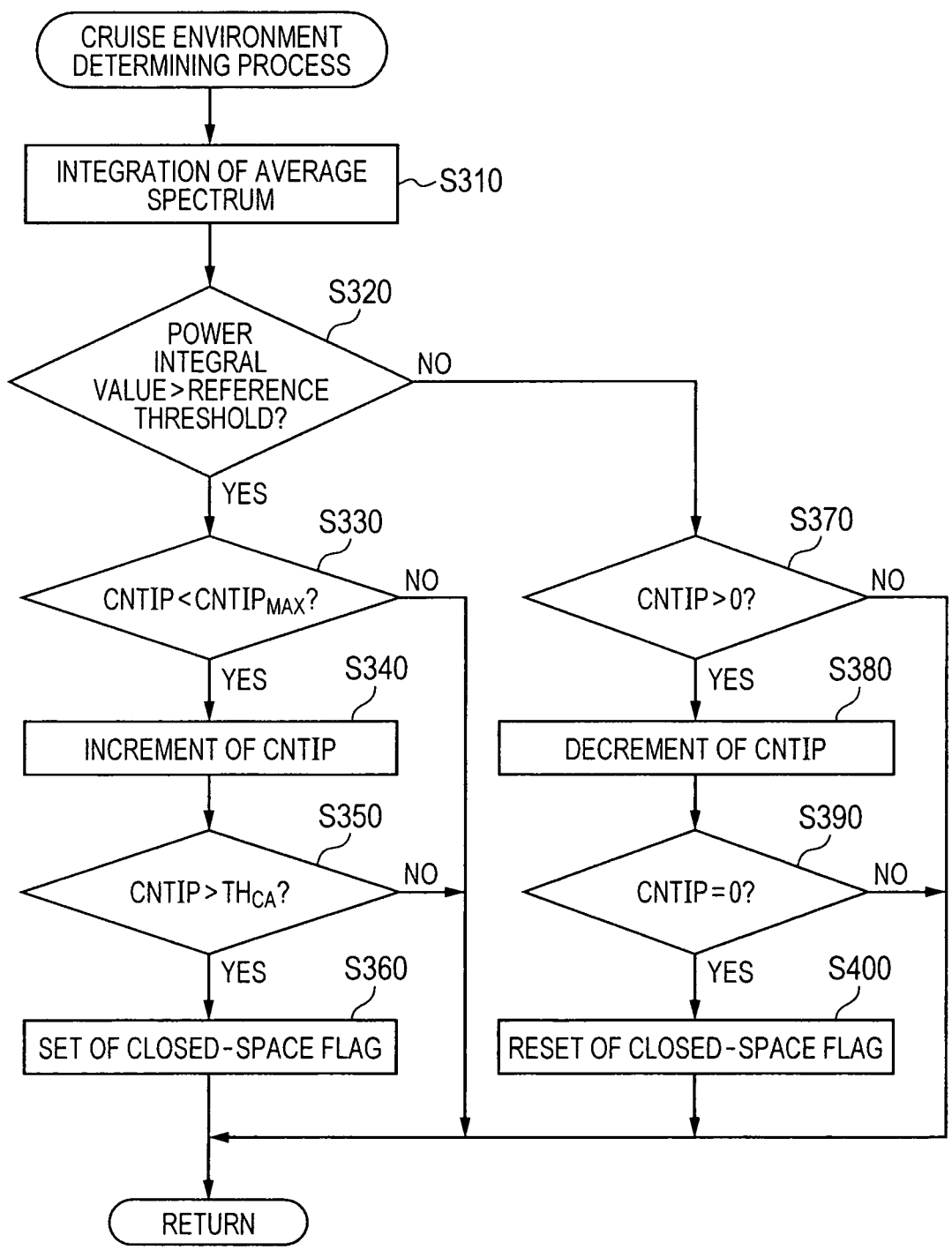
FIG. 3 is a flowchart showing a cruise environment determining process included in the main process.

Next, the cruise environment determining process performed in step S180 of the main process is explained with reference to the flowchart of FIG. 3.

Figure 4:
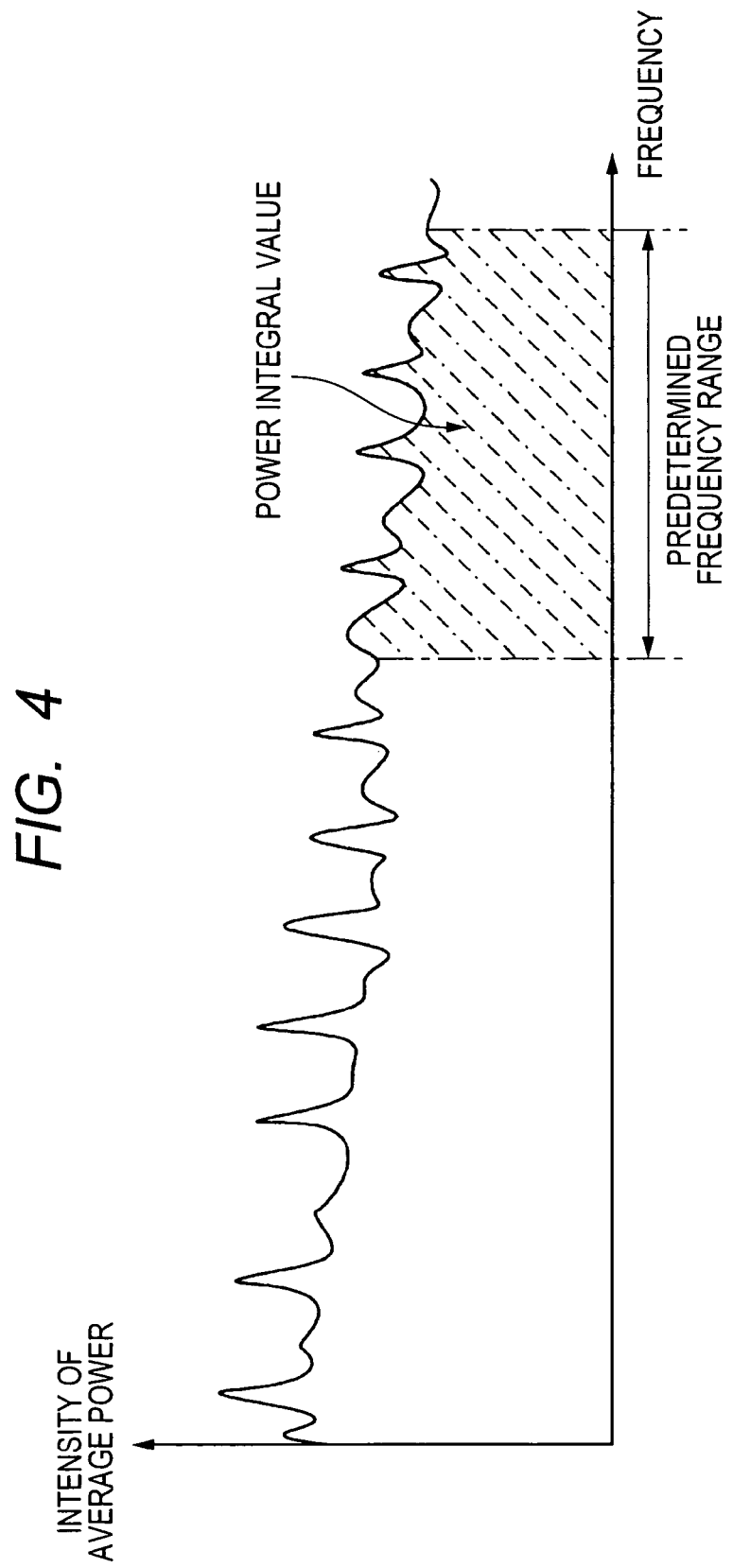
FIG. 4 is a diagram explaining a power integral value calculated in the cruise environment determining process.
Figure 11:
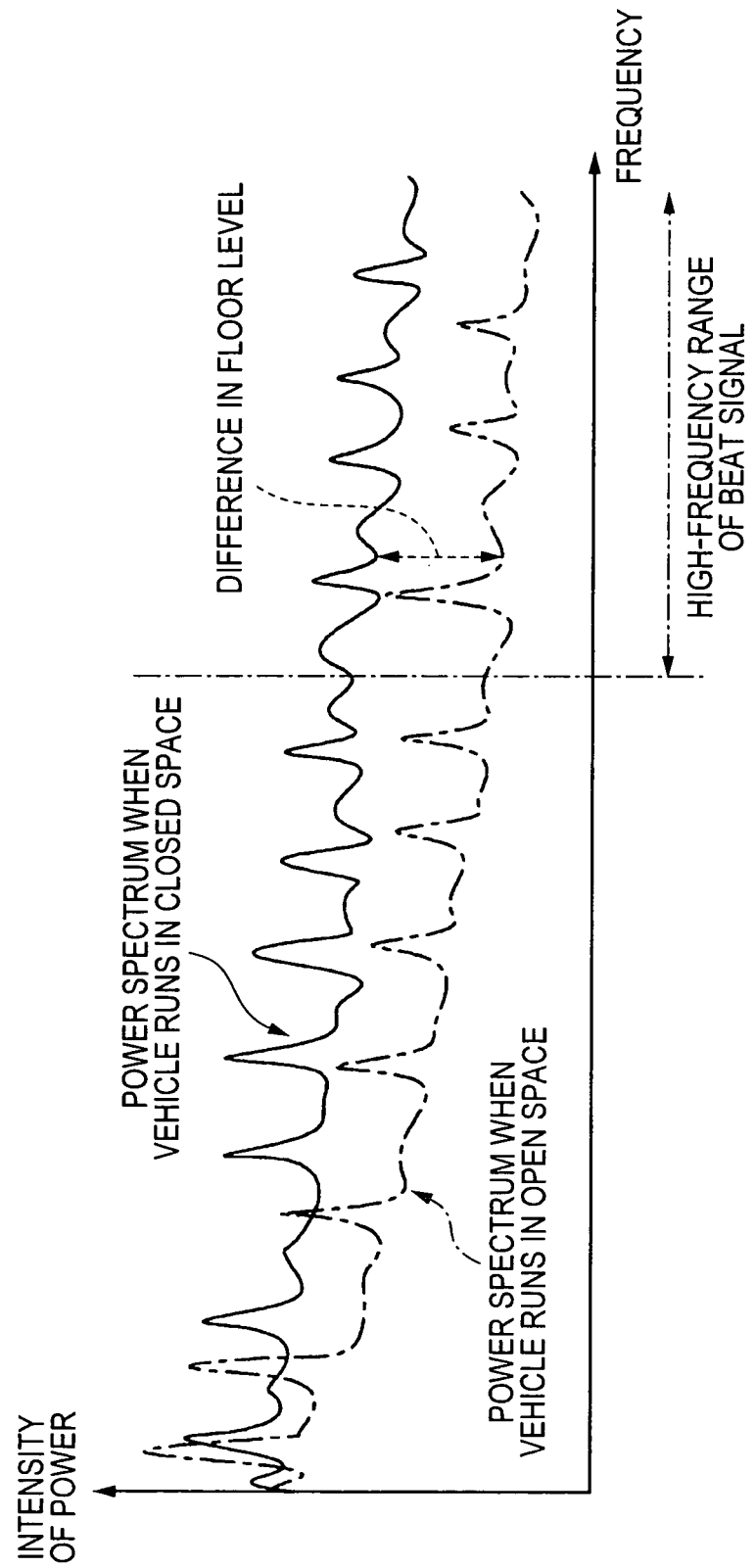
FIG. 11 is a diagram explaining the principle of determining whether the cruise environment is a closed space or not.

The cruise environment determining process begins in step S310 to calculate, as a power integral value, an integral value of the intensity of the average spectrum (power spectrum) shown in FIG. 4 within a specific frequency range. In this embodiment, the specific frequency range is a high frequency range of the beat signal BT (see FIG. 11) where there is a significant difference in floor level between the power spectrum when the vehicle runs in a closed space where the space above the vehicle is closed, and the power spectrum when the vehicle runs in an open space where the space above the vehicle is not closed. The closed space includes a tunnel, a covered road (a snowshed or a rockshed, for example), and an underpass.

Subsequently, it is determined whether or not the calculated power integral value is larger than or equal to a predetermined reference threshold value in step S320. The reference threshold value is set to a value larger than the power integral value calculated when the vehicle runs in an open space and smaller than the power integral value calculated when the vehicle runs in an open space. The reference threshold value may be the sum of the power integral value calculated when the vehicle runs in an open space and a predetermined value.

If the determination result in step S320 is negative, the process proceeds to step S370 explained later. If the determination result in step S320 is affirmative, the process proceeds to step S330 to determine whether or not the count value CNTIP of a closed-space counter is smaller than a predetermined upper limit value $CNTIP_{MAX}$.

If the determination result in step S330 is affirmative, the process proceeds to step S340 to increment the count value CNTIP. Subsequently, it is determined whether or not the count value CNTIP is larger than a predetermined threshold value $TH_{CA}$ ($TH_{CA}$<=$CNTIP_{MAX}$) in step S350.

If the determination result in step S350 is affirmative, the process proceeds to step S360 to set a closed-space flag, assuming that the time elapsed from when the cruising environment of the own vehicle changed to a closed space has exceeded a predetermined time. After completion of step S360, a return is made to step S190 of the main process.

If the determination result in step S350 is negative, the cruise environment determining process is terminated without setting the closed-space flag, assuming that the time elapsed from when the cruising environment of the own vehicle changed to a closed space does not reach the predetermined time, and a return is made to step S190 of the main process. If the determination result in step S330 is negative, the cruise environment determining process is terminated maintaining the closed-space flag in the set state, and a return is made to step S190 of the main process.

In step S370, it is determined whether or not the count value CNTIP is larger than 0. If the determination result in step S370 is affirmative, the process proceeds to step S380 to decrement the count value CNTIP. In this embodiment, the minimum value of the count value CNTIP is 0.

Subsequently, it is determined whether the count value CNTIP is 0 or not in step S390. If the determination result in step S390 is affirmative, the process proceeds to step S400 to reset the closed-space flag, assuming that the time elapsed from when the cruise environment of the own vehicle changed to a closed space has exceeded a predetermined time. Thereafter, the cruise environment determining process is terminated, and a return is made to step S190 of the main process.

If the determination result in step S390 is negative, the cruise environment determining process is terminated maintaining the closed-space flag in the set state, and a return is made to step S190 of the main process, assuming that the time elapsed from when the cruising environment of the own vehicle changed to a closed space does not reach the predetermined time. If the determination result in step S370 is negative, the cruise environment determining process is terminated maintaining the closed-space flag in the reset state, and a return is made to step S190 of the main process, assuming that the cruise environment continues to be an open space.

As explained above, the cruise environment determining process operates to set the closed-space flag assuming that the cruise environment is a closed space if the power integral value calculated based on the power spectrums acquired in step S140 continues to be larger than the reference threshold value over the predetermined time, and reset the closed-space flag assuming that the cruise environment is an open space if the power integral value continues to be smaller than the reference threshold value over the predetermined time.

Figure 5:
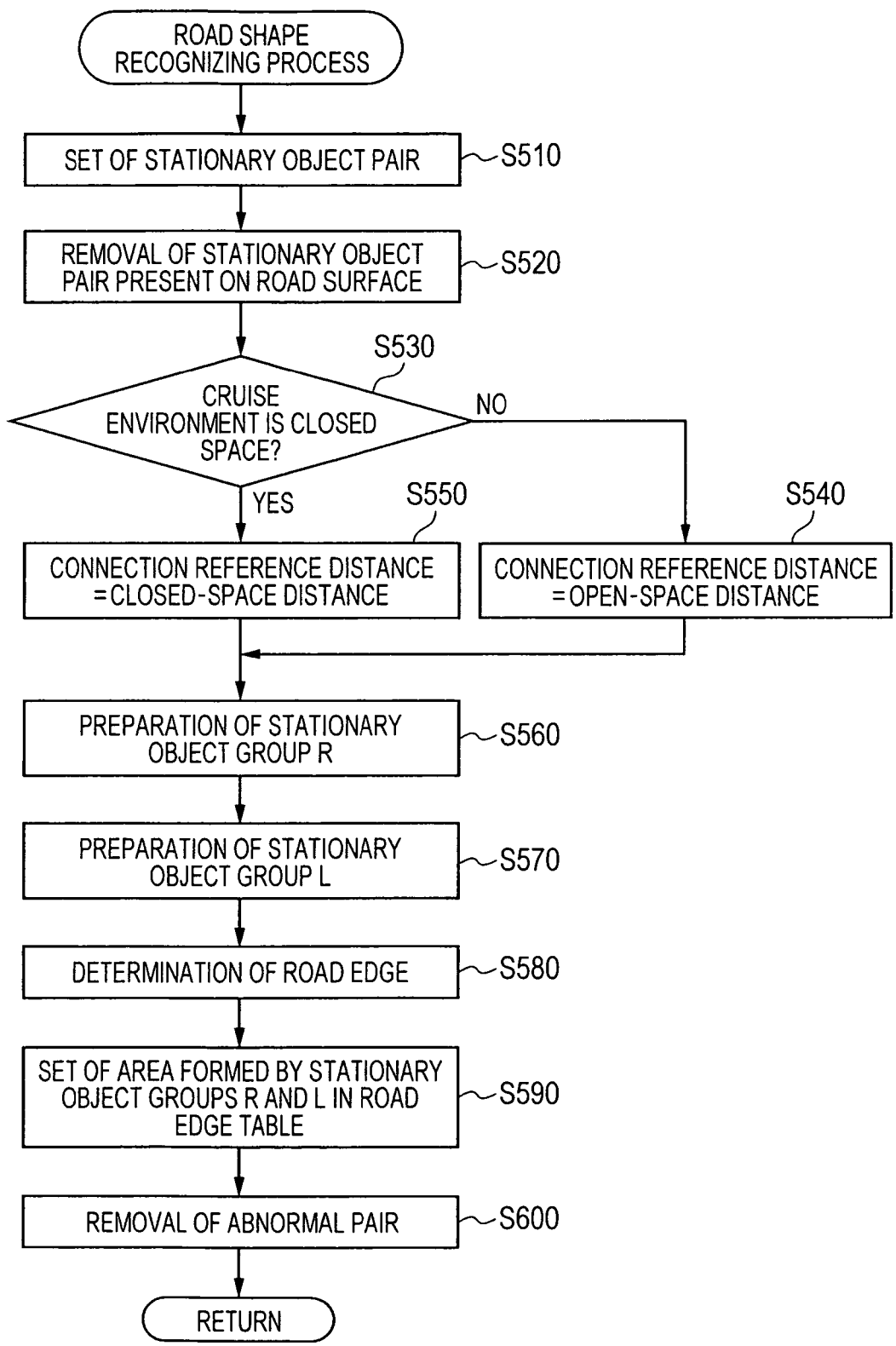
FIG. 5 is a flowchart showing a road shape recognizing process included in the main prices.

Next, the road shape recognizing process performed in step S190 of the main process is explained with reference to the flowchart of FIG. 5.

This process begins in step S510 where, of the pairs of the peak frequencies registered during the previous measurement cycle and the present measurement cycle, the pair (or pairs) representing a stationary object (referred to as "the stationary object pair" hereinafter) is set in a target layout map. The target layout map is a planar map having first and second axes perpendicular to each other, the first axis corresponding to the direction of travel of the own vehicle. Each target candidate is mapped in the target layout map in accordance with the direction and the distance of the target candidate with respect to the own vehicle.

In subsequent step S520, of the stationary object pairs set in the target layout map, the one (or ones) present on the road surface are removed based on the road shape recognized by the previous execution of the main process (that is, recognized by the road shape recognizing process performed in the previous measurement cycle).

In subsequent step S530, it is determined whether or not the cruise environment determined by the cruise environment determining process is an open space. If the determination result in step S530 is negative, the process proceeds to step S540 where a connection reference distance is set to a predetermined open-space distance. If the determination result in step S530 is affirmative, the process proceeds to step S550 where the connection reference distance is set to a predetermined closed-space distance shorter than the open-space distance.

More specifically, in step S530, the cruise environment is determined to be a closed space if the closed-space flag is set, and determined to be an open space if the closed-space flag is not set.

Subsequently, in step S560, a stationary object group R is prepared by sequentially connecting the stationary object pairs present on the right side of the own vehicle, while setting one of these stationary object pairs closest to the own vehicle as a reference point (referred to as "the reference stationary object pair" hereinafter). More specifically, in this step S560, of the stationary object pairs present within the connection reference distance from the reference stationary object pair, the one that is the first to appear in the counter clockwise direction with respect to the direction of travel of the own vehicle is connected to the reference stationary object pair. Subsequently, this connected stationary object pair is newly set as the reference stationary object pair, and of the stationary pairs present within the connection reference distance from the reference stationary object pair newly set, the one that is the first to appear in the counter clockwise direction with respect to the direction of travel of the own vehicle is connected to the newly set reference stationary object pair. This process is repeated to prepare the stationary object group R.

Subsequently, in step S570, the stationary object pairs present on the left side of the own vehicle are connected in sequence, while setting one of these stationary object pairs closest to the own vehicle as a reference point, to prepare a stationary object group L. The process to prepare the stationary object group R and the process to prepare the stationary object group L are the same except for the direction to search the stationary object pairs, and therefore detailed explanation of the process to prepare the stationary object group L is omitted.

Thereafter, the stationary object group R prepared in step S560 and the stationary object group L prepared in step S570 are determined to represent the right and left edges of the road on which the own vehicle is running in step S580. Hereinafter, the right and left edges are collectively referred to as the road edge.

Subsequently, the area formed by the stationary object groups L and R, that is the area surrounded by the line to sequentially connect the stationary object pairs of the stationary object groups L and R is set in a road-edge table in step S590. Subsequently, of the stationary object pairs set in the object layout map, the pair (or the pairs) not representing the road edge ("abnormal pair" in FIG. 5) is removed.

Thereafter, a return to step S200 of the main process is made. As explained above, the road shape recognizing process operates to connect the stationary object pairs present within the connection reference distance from the reference stationary object pair sequentially from the one which is the first to appear in the specific direction with respect to the direction of travel of the own vehicle. The area formed by the grouped stationary object groups is recognized as the road edge (that is, as a road shape). In this embodiment, the connection reference distance used in connecting the stationary object pairs is set to the open-space distance when the cruise environment is an open space, and set to the closed-space distance shorter than the open-space distance when the cruise environment is a closed space.

Figure 6:
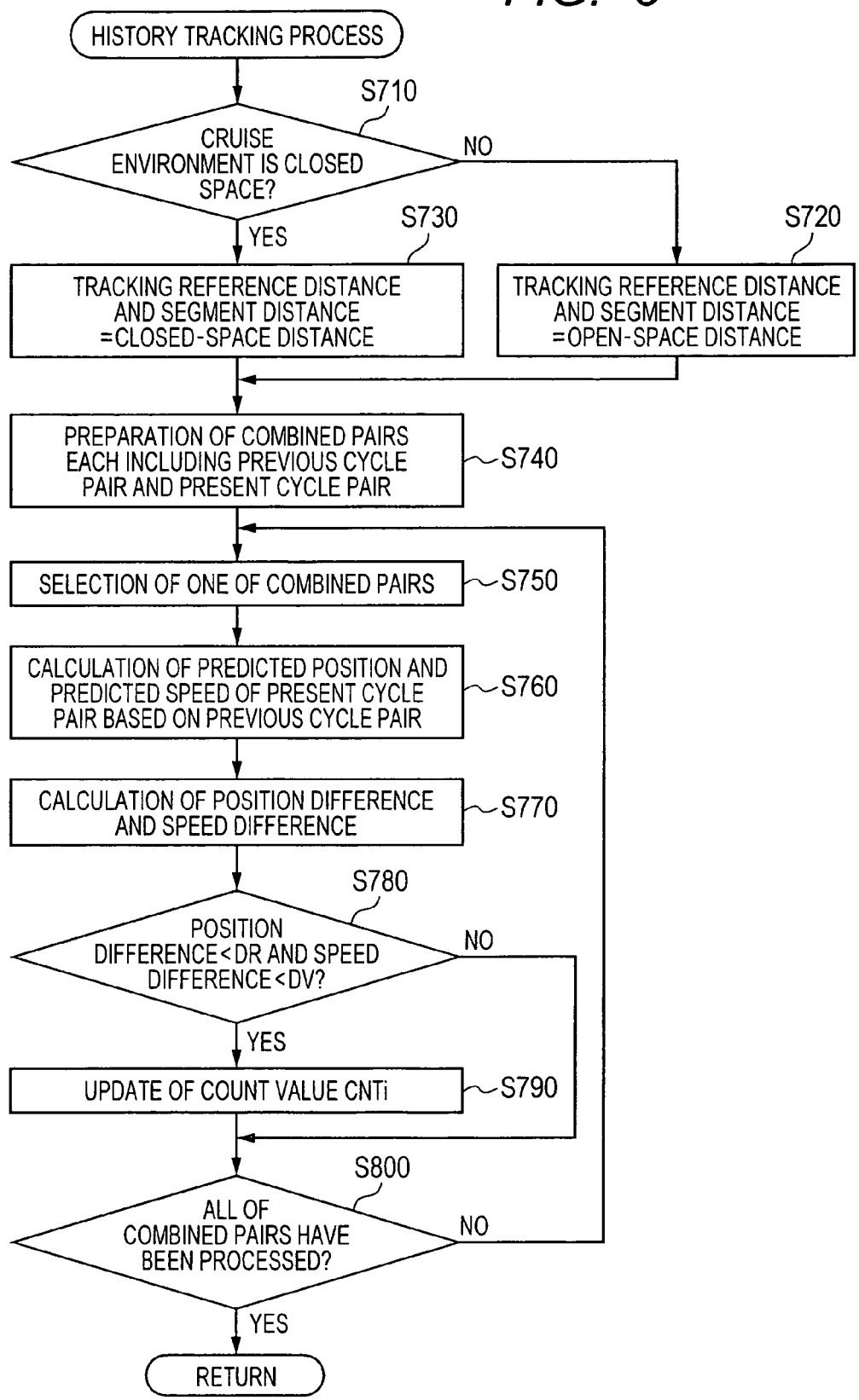
FIG. 6 is a flowchart showing a history tracking process included in the main process.

Next, the history tracking process performed in step S200 of the main process is explained with reference to the flowchart of FIG. 6.

This process begins by determining whether or not the cruise environment is a closed space in step S710.

If the determination result in step S710 is negative, the process proceeds to step S720 to set a tracking reference distance DR and a segment distance DRS to a predetermined open distance. If the determination result in step S710 is affirmative, the process proceeds to step S730 to set the tracking reference distance DR and the segment distance DRS to a predetermined close distance shorter than the open distance. Each of the open distance and the close distance may be set differently for the tracking reference distance DR and the segment distance DRS.

In subsequent step S740, combinations each including one of the pairs of the peak frequencies registered in the previous measurement cycle (referred to as "the previous cycle pairs" hereinafter) and one of the pairs of the peak frequencies registered in the present measurement cycle (referred to as "the present cycles pairs" hereinafter) are set. Subsequently, one of the combinations of the pairs of the peak frequencies (referred to as "the combined pairs" hereinafter) is selected in step S750.

Subsequently, in step S760, the position and the speed of the present cycle pair (respectively referred to as "predictive position" and "predictive speed" hereinafter) of the combined pair selected in step S750 are estimated based on the target information regarding the previous cycle pair of this selected combined pair. The predictive position and the predictive speed can be estimated by a well-known method, for example, a method that uses a Kalman filter to predict time-series behaviors of target candidates (pairs of peak frequencies).

In subsequent step S760, the difference between the position calculated from the present cycle pair (that is, the position of the target candidate represented by the present cycle pair) and the predicted position is calculated as a position difference, and the difference between the speed calculated from the present cycle pair (that is, the speed of the target candidate represented by the present cycle pair) and the predicted speed is calculated as a speed difference.

In subsequent step S780, it is determined whether or not the position difference calculated in step S770 is smaller than the tracking reference distance DR, and the speed difference calculated in step S770 is smaller than a speed difference upper limit DV. If the determination result in step S70 is affirmative, the process proceeds to step S790 where the count value CNTi of a present-cycle pair detecting counter is updated to the count value CNTi of a previous-cycle pair detecting counter plus 1, assuming that the pairs of the peak frequencies of the combined pair have a historical connection.

In step S800, it is determined whether or not steps S750 to 790 have been performed for all the combined pairs set in step 740. If the determination result in step S800 is negative, the process returns to step S750. If the determination result in step S800 is affirmative, the history tracking process is terminated, and a return to step S210 of the main process is made.

As explained above, in the history tracking process, the present cycle pair having a historical connection with the previous cycle pair assumes the information regarding the this previous cycle pair (the count value CNTi of the detection counter), while on the other hand, the count value CNTi of the detection counter is maintained at 0 for the present cycle pair having no historical connection with the previous cycle pair. In this embodiment, the tracking reference distance DR used for determining presence of a historical connection is set to the open distance when the cruise environment is an open space, and set to the close distance shorter than the open distance when the cruise environment is a closed space.

Figure 7:
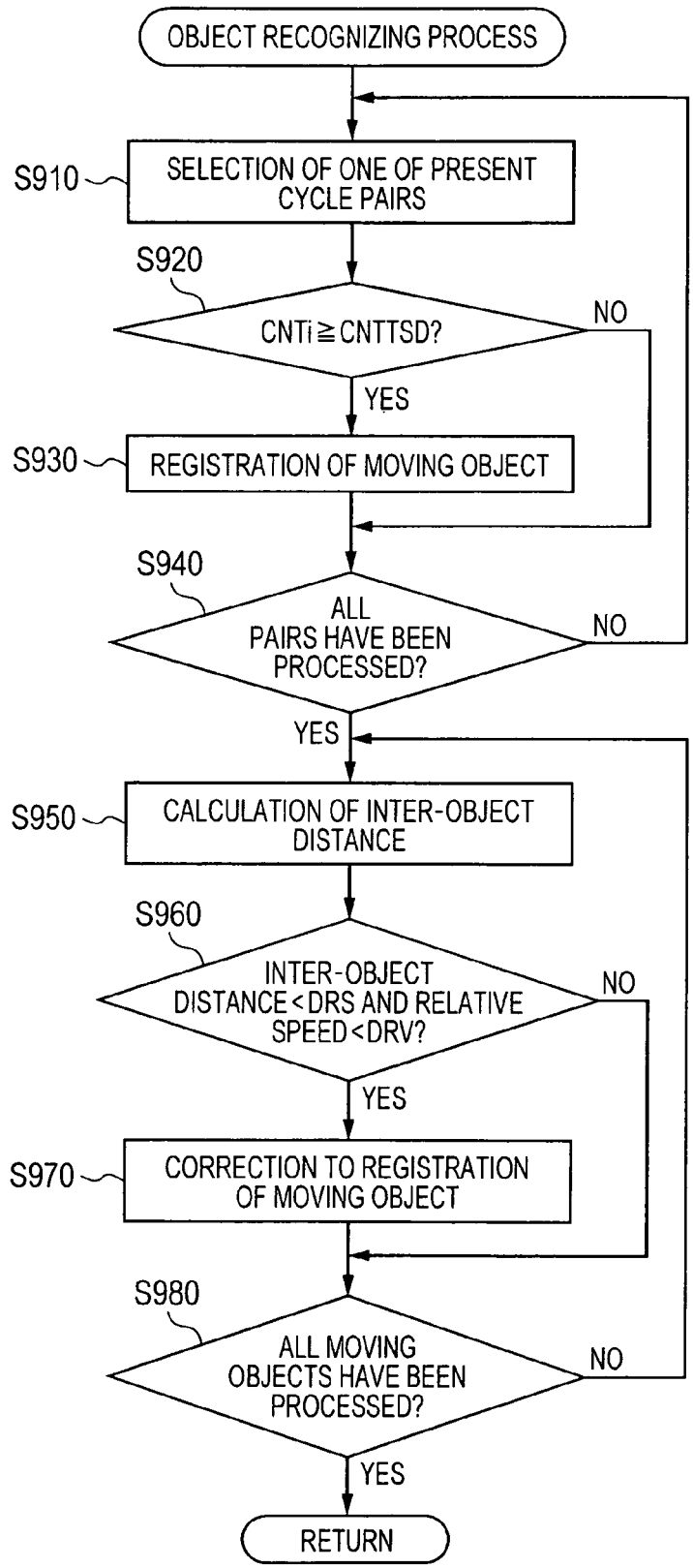
FIG. 7 is a flowchart showing an object recognizing process included in the main process.

Next, the object recognizing process performed in step S210 of the main process is explained with reference to the flowchart of FIG. 7.

This process begins in step S910 to select one of the present cycle pairs registered. Subsequently, it is determined whether or not the count value CNTi of the selected present cycle pair is larger than or equal to a predetermined recognition threshold value CNTTSD in step S920.

If the determination result in step S920 is affirmative, the process proceeds to step S930 where a target candidate corresponding to the present cycle pair selected in step S910 is determined to be a moving object (a preceding vehicle, for example) and registered as a moving object. If the determination result in step S920 is negative, the process proceeds to step S940 to determine whether or not steps S910 to S930 have been performed for all the present cycle pairs. If the determination result in step S940 is negative, the process returns to step S910.

If the determination result in step S940 is affirmative, the process proceeds to step S950 where, of the moving objects registered in step S930, two moving objects are selected, and the distance of the two moving objects (referred to as "the inter-object distance" hereinafter) and the relative speed between the two moving objects (referred to as "the inter-object relative speed" hereinafter) are calculated. Subsequently, it is determined in step S960 whether or not the inter-object distance is smaller than the segment distance DRS set in step S720 or S730, and the inter-object relative speed is smaller than a predetermined relative speed DRV.

If the determination result in step S960 is affirmative, the process proceeds to step S970 where a change is made to the registration of the two moving objects, assuming that the two moving objects are actually one moving object. If the determination result in step S960 is negative, the process proceeds to step S980, assuming that the two moving objects are separate objects.

Subsequently, it is determined whether or not steps S950 to 970 have been performed for all the combinations of the moving objects in step S980. If the determination result in step S980 is negative, the process returns to step S950. If the determination result in step S980 is affirmative, the object recognizing process is terminated, and a return to step S220 of the main process is made.

As explained above, in the object recognizing process, a pair of the peak frequencies detected to have a historical connection with each other is registered as one moving object. Further, if any two of the registered moving objects are determined to be the same one moving object, a change is made to the registration of the two moving objects. In this embodiment, the segment distance DRS used for determining whether an object is constituted of a plurality of registered moving objects is set to the open distance when the cruise environment is an open space, and set to the close distance shorter than the open distance when the cruise environment is a closed space.

In the extrapolation carried out in step S220 of the main process, of the moving objects registered in the previous measurement cycle, the one (or ones) having no historical connection with the pairs of the peak frequencies detected in the present measurement cycle and being within a predetermined extrapolation period continues to be in registration as a moving object by allowing extrapolation of a pair of the peak frequencies. If no pair of the peak frequencies having a historical connection is detected after the extrapolation period elapses, the registration of the moving object is deleted. Since such extrapolation is well known, further detailed explanation is omitted.

Next, the ghost correction carried out in step S230 of the main process is explained.

The ghost correction operates to determine whether each of the registered moving objects is a virtual image or not, and correct the position of the moving object determined as a virtual image to the position of the corresponding real image (that is, the true position of the moving object).

Figure 8:
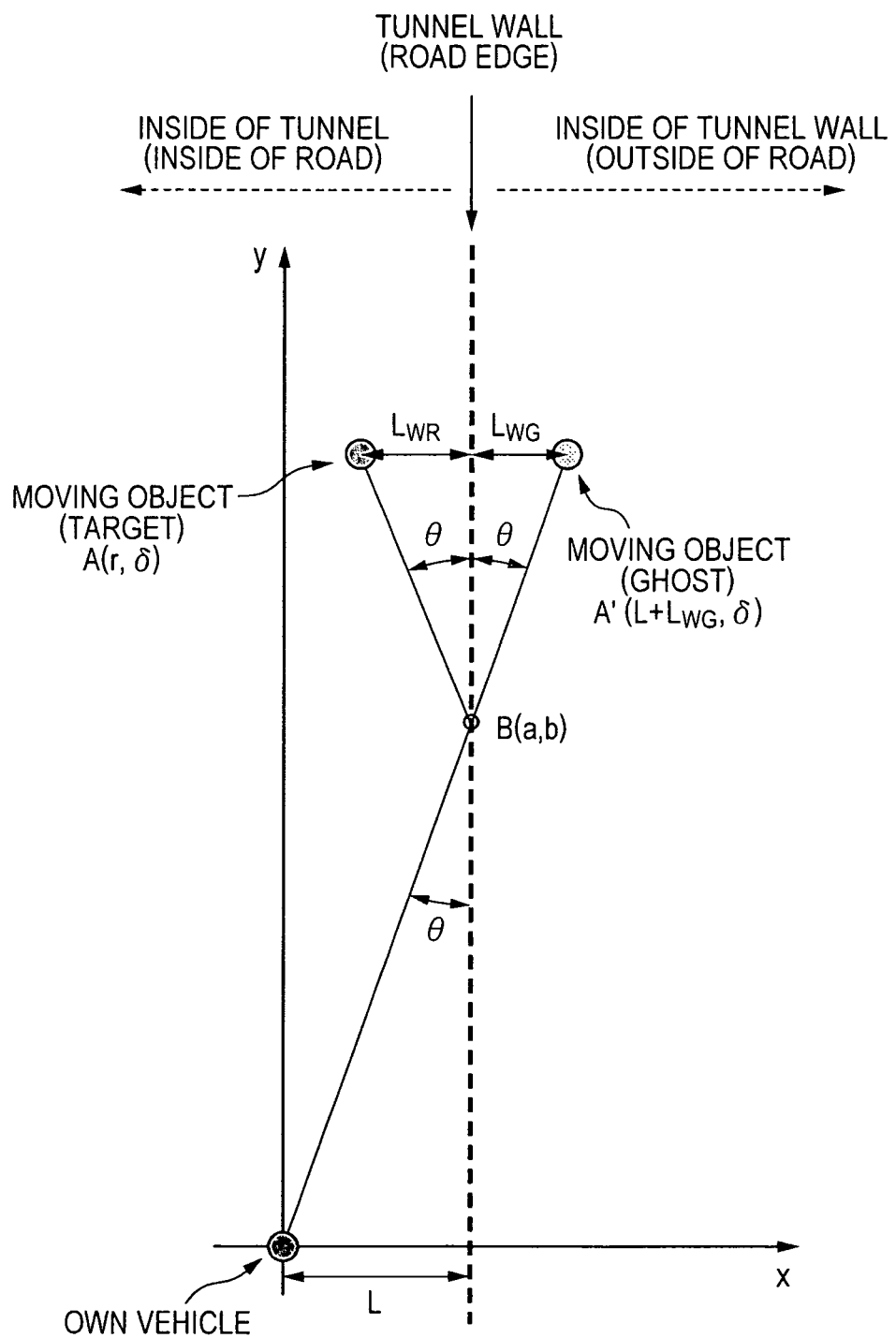
FIGS. 8 to 10 are diagrams explaining ghost correction carried out in the main process.

According to the ghost correction, as shown in FIG. 8, when the road (or tunnel road) is recognized to be straight, of the registered moving objects, the moving object A' present in the position (L+$L_{WG}$, δ) shown in FIG. 8) outside the road edge recognized by the road shape recognizing process by a predetermined distance or more is determined to be a virtual image (a ghost). Subsequently, the position of the moving object A' recognized as a virtual image is corrected to its line-symmetric position (A(γ, δ), $L_{WG}$=$L_{WR}$ in FIG. 8) with respect to the edge of the road.

Figure 9:
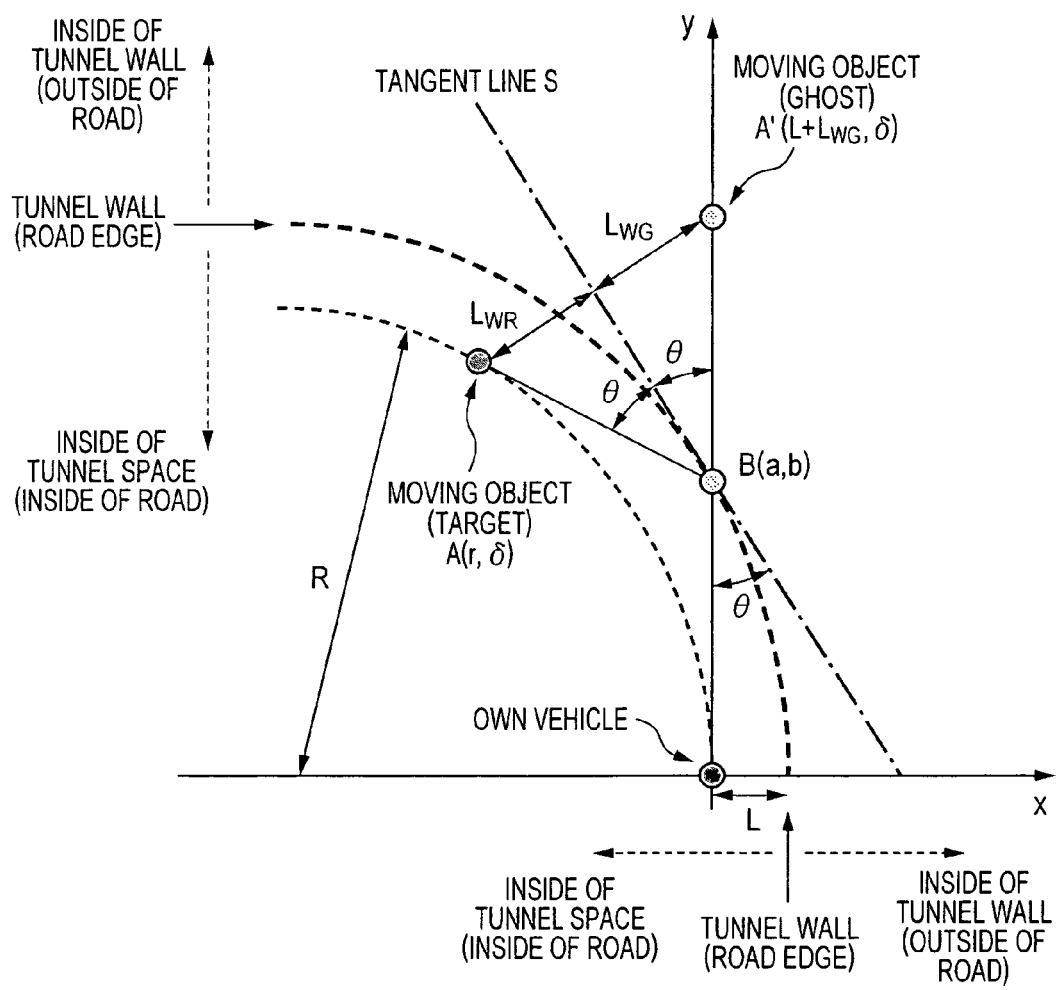

Further, according to the ghost correction, as shown in FIG. 9, when the road (or tunnel road) is recognized to be curved, of the registered moving objects, the moving object A' present in the position ((L+$L_{WG}$, δ) shown in FIG. 9) outside the road edge recognized by the road shape recognizing process by a predetermined distance or more is determined to be a virtual image (a ghost). Subsequently, the position of the moving object A' recognized as a virtual image is corrected to its line-symmetric position (A(γ, δ), $L_{WG}$=$L_{WR}$ in FIG. 9) with respect to the line being tangent to the road edge and passing through the intersection point (B(a, b) in FIG. 9) between the road edge and the line passing through the position of the moving object A' and the position of the own vehicle.

Figure 10:
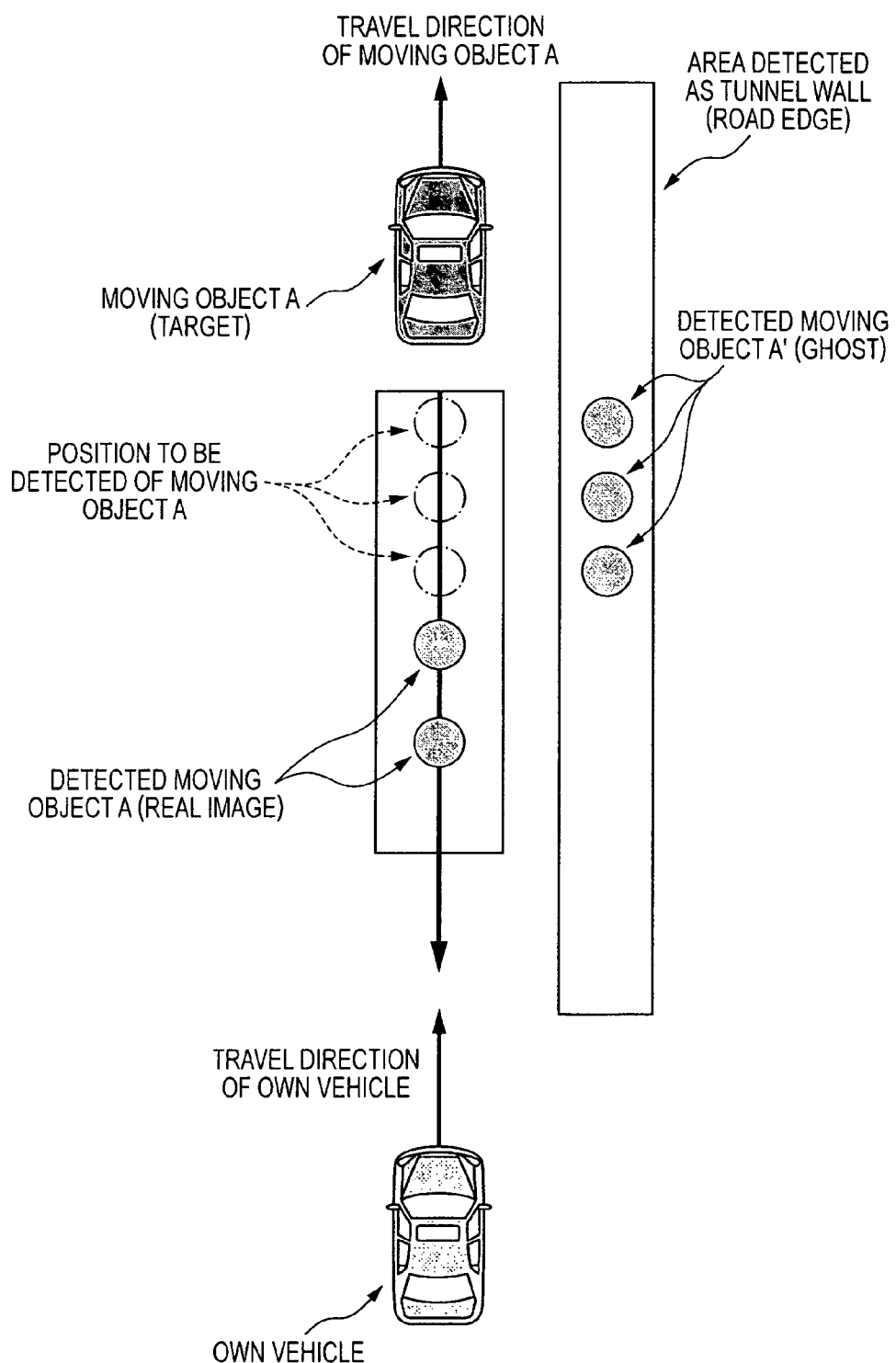

Further, according to the ghost correction, as shown in FIG. 10, of the registered moving objects, the moving object A' present at a position overlapping with the road edge recognized by the road shape recognizing process is determined to be a virtual image (a ghost). Subsequently, the position of the moving object A' determined to be a virtual image is corrected to the closest position on the lane with respect to the road edge (the position of the circle shown by the chain line in FIG. 10).

The ghost corrections described above may be carried out when both the moving objects A and A' are in registration, or when only the moving object A' is in registration.

After completion of the ghost correction, step S240 of the main process is performed to output the target information regarding the moving objects to the cruise-assist ECU 10. Thereafter, the main process is terminated until the next measurement cycle. The above described embodiment provides the following advantages. As explained above, the radar sensor 30 is configured to determine that the cruise environment is a closed space if the power integral value based on the power spectrums calculated by frequency-analyzing the beat signal continues to be larger than or equal to the reference threshold value over the predetermined time, and is an open space if the power integral value continues to be smaller than the reference threshold value over the predetermined time. According to this embodiment, it is possible to determine whether the cruise environment is a closed space or an open space by only the radar sensor 30.

The radar sensor 30 sets the connection reference distance, the tracking reference distance DR and the segment distance DRS to the open-space distance (or open distance) when the cruise environment is an open space, and to the closed-space distance (or close distance) shorter than the open-space distance (or open distance) when the cruise environment is a closed space. Accordingly, according to the radar sensor 30, it is possible to prevent a virtual image due to multiple reflection of the radar wave (that is, a ghost detected as a target candidate although it does not exist actually) from being detected as a road edge or a moving object.

The radar sensor 30 maintains the connection reference distance, the tracking reference distance DR and the segment distance DRS at the open-space distance (or open distance) when the cruise environment is an open space. This makes it possible to maintain the accuracy of recognition of the road edge and moving objects when the vehicle runs in a dark unclosed space (when the vehicle runs in an open space at night, for example) at the same level as that when the vehicle runs in a bright open space.

That is, according to this embodiment, it is possible to accurately determine whether the cruise environment is a closed space or not by a single body of the radar sensor 30, and to prevent the accuracy of recognition of the road edge and moving objects from being deteriorated when the vehicle runs on a dark road.

Further, if a detected moving object is a virtual image, the radar sensor 30 collects the position of the detected moving object to the position of a corresponding real image. Accordingly, according to this embodiment, the position of a moving object can be accurately recognized even if a virtual image (ghost) of the moving object is detected.

Hence, according to the cruise-assist control system 1 of this embodiment, it is possible to perform vehicle safety control (pre-crash safety control or autocruise control, for example) more reliably using information regarding moving objects acquired by the radar apparatus 30.

OTHER EMBODIMENTS

It is a matter of course that various modifications can be made to the above described embodiment as described below.

In the above embodiment, setting of the connection reference distance depending on the cruise environment is carried out during the road shape recognizing process (steps S530 to S550). However, it may be carried out immediately after completion of, or during the cruise environment determining process. That is, steps S530 to S550 may be performed immediately after completion of the cruise environment determining process, or after step S360 or step S400 of the cruise environment determining process.

In the above embodiment, setting of the tracking reference distance DR and the segment distance DRS depending on the cruise environment is carried out during the history tracking process (steps S710 to S730). However, it may be performed immediately after completion of, or during the cruise environment determining process.

Each of the connection reference distance, tracking reference distance DR and segment distance DRS may include a component in the direction of travel of the own vehicle (longitudinal distance), and a component in the lateral direction of the own vehicle (lateral distance). In this case, it is preferable that the closed-space distance set as the connection reference distance in step S550 of the road shape recognizing process, and the close distance set as the tracking reference distance DR or segment distance DRS in step S730 of the history tracking process is at least the lateral distance.

In the ghost correction (step S230), a moving object which is detected to be present outside the road edge recognized by the road shape recognizing process and distant from the road edge by a predetermined distance or more is determined to be a virtual image (a ghost). However, any other suitable method of determining whether a detected moving object is a real image or a virtual image may be adopted. Likewise, any other suitable method of correcting the position of a detected virtual image to the position of a corresponding real image may be adopted.

The above explained preferred embodiments are exemplary of the invention of the present application which is described solely by the claims appended below. It should be understood that modifications of the preferred embodiments may be made as would occur to one of skill in the art.

What is claimed is:

1. A radar apparatus for use in a vehicle comprising:
a transmitting/receiving unit for transmitting a radar wave frequency-modulated so as to linearly vary in frequency with time at every predetermined measurement cycle, receiving the radar wave reflected from a target as a reflected wave, and generating a beat signal by mixing a transmission signal of the radar wave with a reception signal of the reflected wave;
a frequency analyzing unit for deriving power spectrum indicative of frequency contained in the beat signal and intensity at each frequency each time the transmitting/receiving means generates the beat signal;
a target candidate detecting unit for detecting, as a target candidate which has a possibility of being the target, a peak frequency indicative of each frequency at which the intensity of the power spectrum becomes maximum, and deriving a position and a speed of each target candidate each time the frequency analyzing unit generates the power spectrum;
a road shape recognizing unit for sequentially connecting along a predetermined direction and grouping together the target candidates which are detected by the target candidate detecting unit at one or more measurement cycles and which are stationary and present within a set first reference distance from a position of the target candidate making a reference point, and recognizing a road shape including at least a road edge which is an area where positions of the grouped target candidates are connected in the order of connection;

an object recognizing unit for making a determination, for each of the moving target candidates which are detected by the target candidate detecting unit, that the target candidate is a moving object if the target candidate detected at the next measurement cycle continues to be within a set second reference distance from a predicted position of the target candidate predicted based on positions of the target candidate detected at previous measurement cycles for over a predetermined number of the measurement cycles;

a cruise environment estimating unit for estimating that a cruise environment representing an environment of a road on which an own vehicle is running is a closed space where a space above a running surface of the road is closed if an integral value of the intensity of the power spectrum derived by the frequency analyzing unit for a predetermined frequency range is larger than a predetermined reference threshold value; and a reference distance correcting unit for shortening at least one of the first and second reference distances if the cruise environment is estimated to be the closed space by the cruise environment estimating unit compared to if the cruise environment is an open space.

2. The radar apparatus according to claim 1, wherein the object recognizing means includes:

a moving object determining unit for sequentially connecting along a predetermined direction and grouping together the moving objects which are recognized at one measurement cycle and present within a set reference distance from a position of the moving object making a reference point, and recognizing a group of the grouped moving objects as a single moving object; and a distance shortening unit for shortening the set reference distance used by the moving object determining unit if the cruise environment is estimated to be the closed space by the cruise environment estimating unit compared to if the cruise environment is the open space.

3. The radar apparatus according to claim 1, wherein the reference distance correcting unit is configured to shorten a distance along a vehicle-width direction as the first or second reference distance.

4. The radar apparatus according to claim 1, wherein the cruise environment estimating unit is configured to derive an integral value by integrating the intensity of the power spectrum for the predetermined frequency range over a plurality of the measurement cycles.

5. The radar apparatus according to claim 1, further comprising a virtual image correcting unit for making a determination whether or not the moving object recognized by the object recognizing unit is a virtual image when the cruise environment is estimated to be the closed space by the cruise environment estimating unit, and if the moving object is determined to be a virtual image, correcting a position of the moving object onto a road based on the road shape recognized by the road shape recognizing unit.

6. The radar apparatus according to claim 5, wherein the virtual image correcting unit is configured to determine that the moving object is a virtual image if the position of the moving body is outside the road edge by a predetermined distance or more, and correct the position of the moving body to a line-symmetrical position with respect to a predetermined axis of symmetry.

7. The radar apparatus according to claim 6, wherein the virtual image correcting unit is configured to define the road edge as the predetermined axis of symmetry if the road shape is a straight line.

8. The radar apparatus according to claim 6, wherein the virtual image correcting unit is configured to define as the predetermined axis of symmetry a line tangent to the road edge and passing through an intersection point between the road edge and a line passing through the position of the moving body and the position of the own vehicle if the road shape is a curved line.

9. The radar apparatus according to claim 5, wherein the virtual image correcting unit is configured to determine that the moving object is a virtual image if the moving body is on the road edge recognized by the road shape recognizing unit, and correct the position of the virtual image onto a lane based on the road edge.

10. The radar apparatus according to claim 1, wherein the cruise environment estimating unit is configured to regard at least one of a tunnel, a covered road and an underpass as the closed space.

* * * * *